United States Patent
Gryskiewicz

(10) Patent No.: US 7,372,505 B2
(45) Date of Patent: May 13, 2008

(54) PROGRAMMABLY CONTROLLING VIDEO FORMATS

(75) Inventor: Paul S. Gryskiewicz, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 520 days.

(21) Appl. No.: 11/004,603

(22) Filed: Dec. 3, 2004

(65) Prior Publication Data

US 2005/0128352 A1  Jun. 16, 2005

Related U.S. Application Data

(63) Continuation of application No. 09/191,764, filed on Nov. 13, 1998, now Pat. No. 6,839,093.

(51) Int. Cl.
*H04N 5/56* (2006.01)
*H04N 5/445* (2006.01)

(52) U.S. Cl. .................. 348/555; 348/554; 345/603

(58) Field of Classification Search ........ 348/554–558, 348/552, 705, 706, 589; 345/603, 604; H04N 5/46, H04N 5/445
See application file for complete search history.

(56) References Cited

U.S. PATENT DOCUMENTS

| | | | | |
|---|---|---|---|---|
| 4,460,918 | A * | 7/1984 | Flasza | 348/554 |
| 4,743,958 | A * | 5/1988 | Bannister et al. | 348/708 |
| 5,255,097 | A * | 10/1993 | Spiero et al. | 348/706 |
| 6,839,093 | B1 * | 1/2005 | Gryskiewicz | 348/555 |

* cited by examiner

*Primary Examiner*—M. Lee
(74) *Attorney, Agent, or Firm*—Trop, Pruner & Hu, P.C.

(57) ABSTRACT

A video controller may include at least one video input port which may be programmably configured to receive either RGB or non-RGB color space signals. The video controller may programmably operate in either an RGB or non-RGB mode. In this way, the number of color space conversions may be reduced in some embodiments. For example, where a television output device is coupled to the video controller, the video controller may provide a non-RGB output signal.

19 Claims, 3 Drawing Sheets

PROGRAMMABLY CONTROLLING VIDEO FORMATS

RELATED APPLICATIONS

This is a continuation of prior application Ser. No. 09/191,764, filed Nov. 13, 1998, that issued as U.S. Pat. No. 6,839,093.

BACKGROUND

This invention relates generally to controlling video formats, for example in graphics accelerators or controllers that enable text and/or graphics to be displayed on a display such as a television receiver, a monitor or a liquid crystal (LCD) display, as examples.

Conventional displays such as monitors and liquid crystal displays (LCD) used in connection with electronic devices such as computer systems, often use the RGB color space. In the RGB color space an image may be resolved into pixels having red, green and blue intensity values.

A video adapter may generate the video signal for a video display. A graphics controller or accelerator may be part of the video adapter and may allow access to a video adapter buffer, or video memory, that stores data such as graphics or character data. Graphics controllers or accelerators work in the RGB color space. When it is desired to work in a video format such as a color space other than RGB, the non-RBG video is converted to the RGB color space and then is provided to the graphics controller which thereafter produces an RGB output.

A variety of other color spaces are used. For example, the U.S. television broadcasting system generally uses the National Television Systems. Committee (NTSC) standard which uses the YUV color space. British television broadcasting uses the phase alternate line or PAL system which makes use of the YUV color space. French television broadcasting uses the Sequential Coleur Avec Memoire (SECAM) system which uses the YDrDb color space. The International Consultative Committee On Broadcasting, known as ITU-R, has developed a digital color system known as YCrCb or ITU-R-BT.601 or CCIR-601. High Definition Television (HDTV) uses the YCrCb color space as well, according to the Advanced Television Systems Committee (ATSC) Guide to the Use of the ATSC Digital Standard, ATSC Doc. A/54, 4 Oct. 1995.

Thus, there are a number of different color spaces that may be utilized with television systems, which do not operate in the RGB color space. Generally, the conversion to the RGB color space may involve a simple mathematical operation such as simple multiplying and shifting. Known equations are available to convert any of the PAL, NTSC, SECAM or ITU-R-BT.601 color spaces to or from the RGB color space. Software is generally known for making these conversions as well.

Graphics controllers that receive non-RGB inputs may provide output signals to a device which does not use the RGB format. However, the graphics controller may only work with RGB color space input signals. Therefore, a non-RGB input signal may be converted to the RGB format. Similarly, the output signal from the graphics controller may be converted back to a non-RGB format in order to be displayed in a non-RGB format, on a conventional television receiver, for example. In some instances, the original input signal is initially converted from a non-RGB to RGB and then back to the non-RGB format.

Thus, there is a need for systems for controlling video formats that operate more flexibly with the variety of available color spaces and that are more efficient in handling color space conversions.

SUMMARY

In accordance with one embodiment, a video controller may include a video input port. A device programmably configures the port to selectively accept one of at least two video formats.

DETAILED DESCRIPTION

Figure 1:
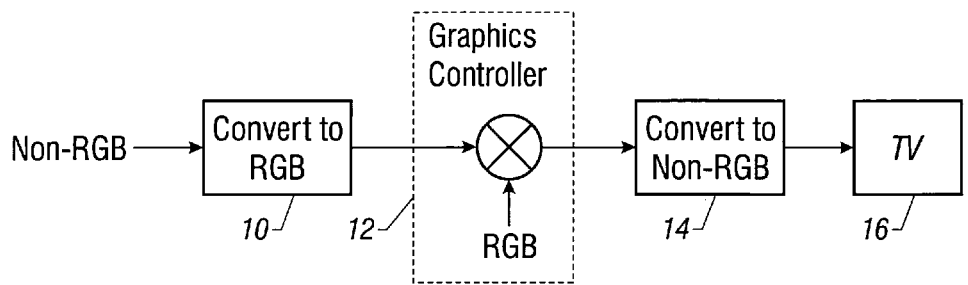
FIG. 1 is a block diagram of a graphics controller of the prior art.

A graphics device or video controller for controlling video, such as a graphics accelerator or controller 12, shown in FIG. 1, may mix or blend video input signals. In the illustrated embodiment, a non-RGB color space input signal is mixed with an RGB color space input signal in the graphics controller 12. This mixing may be desirable, for example, to overlay one video stream over another, such as graphics data over video capture data, or to add backgrounds, textures or colors to a video stream, as another example.

Since conventional graphics controllers work in the RGB color space, the non-RGB input signal is converted to RGB color space, as indicated in block 10. If graphics are intended for an output device which uses a non-RGB format, such as a television receiver 16, the RGB output signal of the graphics controller 12 is again converted to a non-RGB format as indicated at 14.

Figure 2:
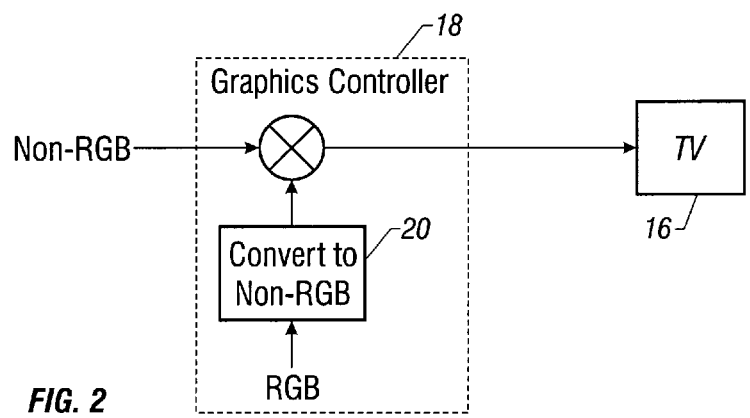
FIG. 2 is a block diagram showing a graphics controller in accordance with one embodiment of the invention.

Referring now to FIG. 2, in accordance with one embodiment of the invention, given the same circumstances shown in FIG. 1, the conversion to or from an RGB or non-RGB format may be controlled based on the type of output device 16. Thus, where the output device 16 is a television receiver, it may be advantageous to work in the non-RGB format since the eventual output of the graphics controller 18 is intended to be in a non-RGB format. Instead of converting the non-RGB input, the RGB input may be converted to the non-RGB format used by the output device, as indicated in block 20. Thereafter, the two video input streams, in a non-RGB format, are mixed and provided in the appropriate non-RGB format to the receiver 16.

Thus, with the embodiment of the invention shown in FIG. 2, only one color space conversion may be used instead of the two conversions used in embodiment of FIG. 1. This may be accomplished, for example, by programmably controlling an input port of the graphics controller 18 in accordance with the nature of the intended output device. Thus, in the case where the output device is in a non-RGB format, an RGB input signal is converted to the non-RGB format rather than vice versa.

In normal mode, the graphics controller 18 may default to the RGB color space, in one embodiment of the invention. When a non-RGB output is desired, for example for a television receiver 16, the default setting may be overridden, in one embodiment of the invention.

Figure 3:
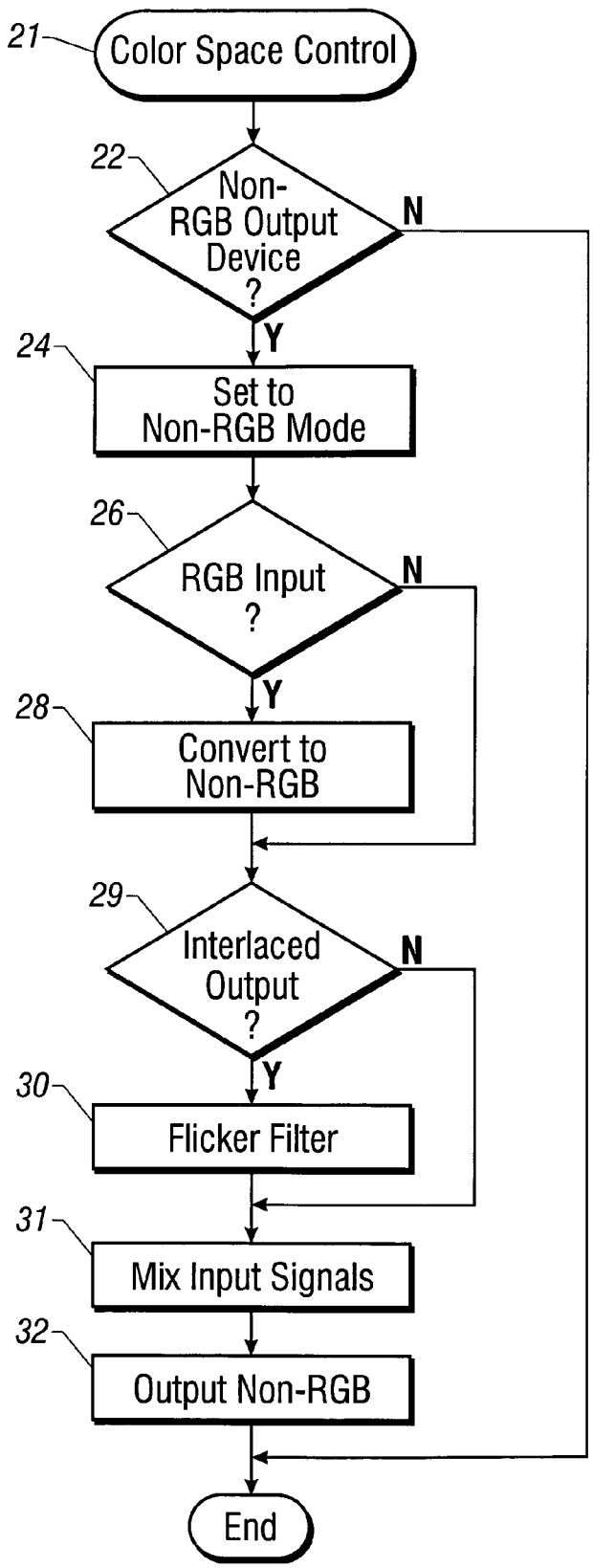
FIG. 3 is a flow diagram showing one flow for implementing an embodiment of the invention.

Turning now to FIG. 3, software 21, in one embodiment of the invention, for controlling a programmable graphics controller 18 may initially determine, at diamond 22, whether the output device, such as the device 16, is a non-RGB format output device. If not, the default setting (RGB) is utilized by the graphics controller and no further operations are needed.

Where a non-RGB output device is detected, for example based on user settings, the graphics controller 18 may be set to the non-RGB mode, as indicated in block 24. This non-RGB mode setting may indicate to the graphics controller 18 that appropriate non-RGB signals are mixed in the non-RGB mode rather than being converted into the RGB format. This, in effect, may override the default setting on the graphics controller 18 which would otherwise provide an RGB output.

Next, a check at diamond 26 determines whether a RGB input signal is being provided to the graphics controller 18. If so, this input may be converted to a non-RGB output consistent with the intended output device 16. This conversion may be done, in one embodiment of the invention, by a software operation which may involve simple multiplication and shifting.

Equations for converting between RGB color space and non-RBG color spaces, such as those used in television broadcasting, are well known. For example, equations for making these conversions are set forth in Mattison, Philip E., *Practical Digital Video with Programming Examples in C* John Wiley & Sons (1994) at page 110.

A check at diamond 29 may determine whether the controller output signal is intended for an interfaced output device such as a television receiver as indicated at diamond 29. If so, flicker filtering may be applied to graphics, as indicated in block 30.

Next, video input signals, in the same color space format, may be mixed as indicated in block 31 and a non-RGB output may be provided as indicated in block 32. In some embodiments it may be desirable to provide both non-RGB and RGB output signals.

Figure 4:
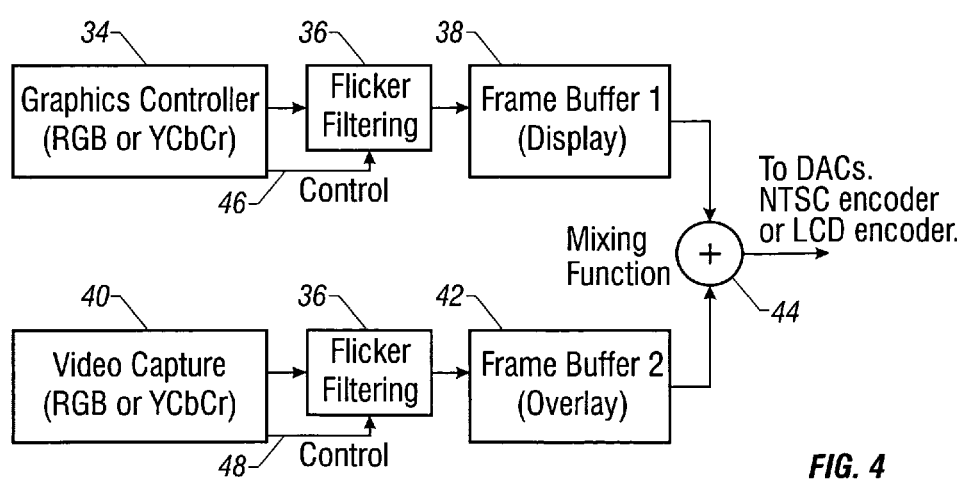
FIG. 4 is a block diagram of another embodiment of the invention.

Referring next to FIG. 4, one embodiment of the invention may utilize selective flicker filtering at a graphics controller 34 coupled to a frame buffer which provides a display to a video display device. The graphics controller 34 may output either RGB or YCbCr, in the illustrated embodiment. If the display is a television display, flicker filtering may be provided as indicated in block 36 in response to a control signal 46 as described previously.

The graphics controller then drives a frame buffer or video memory. Similarly a video capture device 40 may provide video in either RGB or YCbCr formats, in the illustrated embodiment. Flicker filtering may be provided as indicated at block 36 if a television receiver is the intended output device. Again, the application of flicker filtering may be controlled by a control signal 48. In one embodiment, the flicker filtering control may be provided by software.

Captured video information may then be provided to a second frame buffer 42, which in the illustrated embodiment, is an overlay buffer. A mixing function may occur at 44 and an output signal may be provided to the appropriate video output device which in some embodiments may be a digital to analog converter, an NTSC encoder, or an LCD encoder, as examples.

Figure 5:
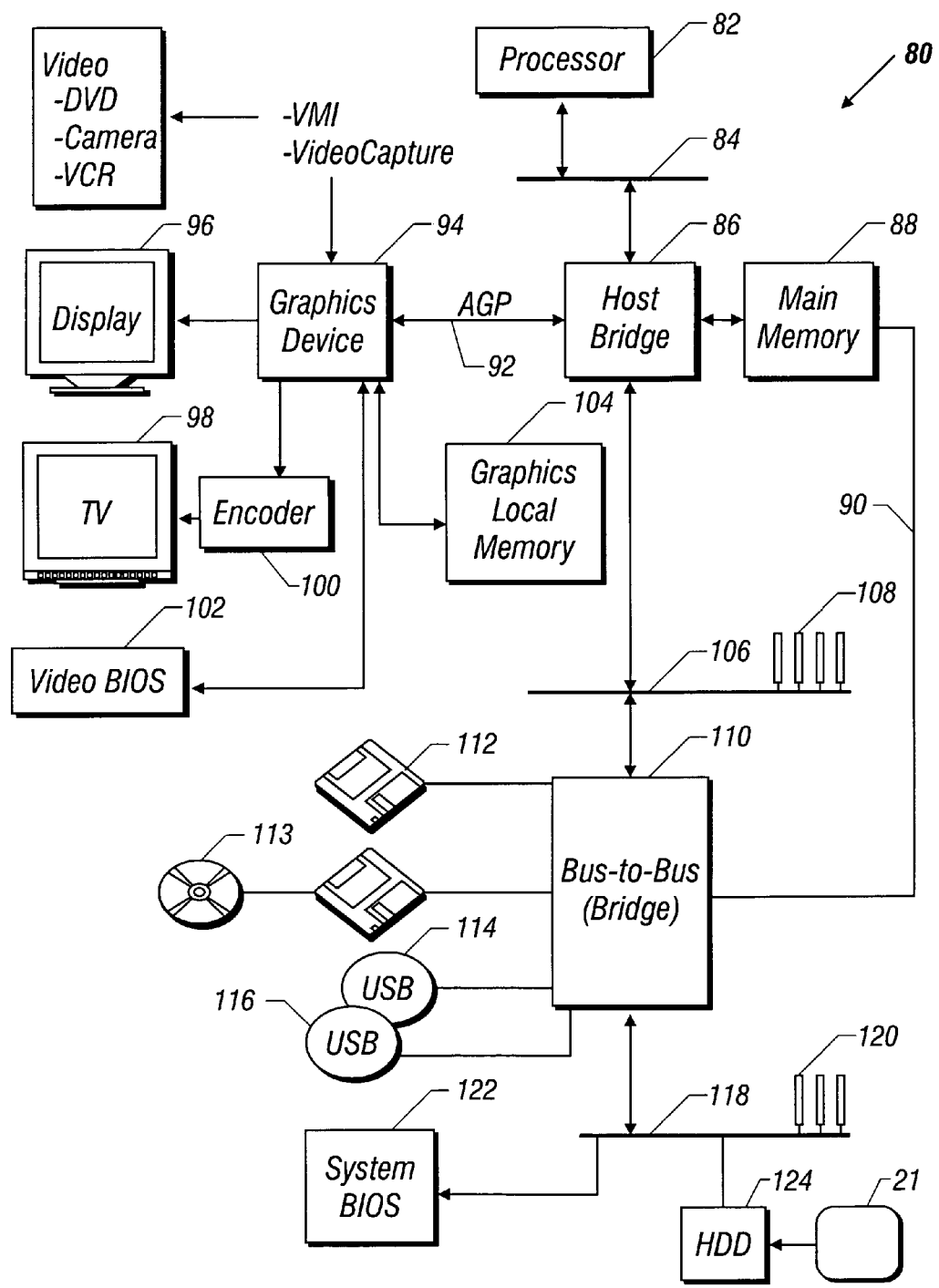
FIG. 5 is a block diagram of a computer system that may utilize an embodiment of the invention such as that shown in FIG. 4.

As illustrated in FIG. 5, in one embodiment of the invention, the graphics controller may be a part of a system including a processor 82. In one embodiment of the invention, the system may be a so-called set-top computer system. A set-top computer system may operate either with a conventional computer system monitor or with a television receiver operating as a display for displaying, for example, both computer graphics and television information.

The system 80 may include a processor 82 coupled to a host bus 84. The host bus 84 in turn may be coupled to a host bridge 86 which may be coupled to main memory 88 and an accelerated graphics port (AGP) 92. (See the Accelerated Graphics Port Interface Specification, Revision 1.0, Jul. 31, 1996, by Intel Corporation, Santa Clara, Calif.) The port 92 in turn may be coupled to a graphics device 94 which may include a graphics controller 34 for example. The graphics device 94 may receive captured video as illustrated and may be coupled to a conventional computer monitor 96. The device 94 may also be coupled through an encoder 100 to a television monitor 98. The graphics device 94 may be coupled to a graphics local memory 104 and a video basic input/output system (BIOS) 102 in one embodiment of the invention.

The host bridge 86 may also couple a bus 106 which may receive a plurality of cards in slots 108. The bus 106 may be coupled to a bus-to-bus bridge 110 which may be coupled to a variety of storage devices including a floppy disk drive 112, a compact disk drive 113 or a pair of Universal Serial Bus (USB) ports 114 and 116. (See the Universal Serial Bus Specification, Revision 1.0, Jan. 15, 1996.) The bridge 110 may also link to the main memory 88 through a system management (SM) bus 90.

The bridge 110 may also be coupled to another bus 118 which includes slots 120. The bus 118 may couple a system BIOS 122 and a hard disk drive 124 which may include the software 21 described previously.

The detection of the nature of the output device or the color space of an input signal may be done, for example, by checking configuration information that he stored in a Windows® registry or a database. This information may be accessed by an operating system. Based on a device's configuration ID its color space requirements can be determined. Otherwise, a user query, for example through a graphical user interface, may be used to identify the color space used by a coupled device.

Among the advantages of certain embodiments of the invention, unnecessary color space conversions can be avoided, higher quality video may be displayed, and more efficient operation of the graphics controller may be achieved. This may be beneficial, for example, in accordance with systems, such as set-top computer systems, which may selectively operate either with a television receiver or a monitor as a display.

While the present invention has been described with respect to a limited number of embodiments, those skilled in the art will appreciate numerous modifications and variations therefrom. It is intended that the appended claims cover all such modifications and variations as fall within the true spirit and scope of the present invention.

What is claimed is:

1. A method, comprising:
   determining whether an output device accepts an RGB color space input or a non-RGB color space input;
   combining at least two sources of video information in the non-RGB color space if the determining determines that the output device accepts the non-RGB color space input; and mixing at least two sources of video information in the RGB color space if the determining determines that the output device accepts the RGB color space input.

2. The method of claim 1, wherein the non-RGB color space is a YCbCr color space.

3. The method of claim 1, further comprising:
converting input video information in the RGB color space to non-RGB video information before the combining if the determining determines that the output device accepts the non-RGB color space input.

4. The method of claim 1, further comprising:
applying flicker filtering to input information before the combining if the determining determines that the output device accepts the non-RGB color space input.

5. The method of claim 1, further comprising:
providing mixed video information in the RGB color space to a video output device.

6. The method of claim 1, further comprising:
providing combined video information in the non-RGB color space to a video output device.

7. A method, comprising:
receiving first input information in an RGB color space;
receiving second input information in a non-RGB color space;
converting the first input information to third input information in the non-RGB color space with a single color conversion; and
combining the second input information and the third input information in the non- RGB color space to produce output information.

8. The method of claim 7, wherein the non-RGB color space is a YCbCr color space.

9. The method of claim 7, further comprising:
applying flicker filtering to the second input information before the combining.

10. The method of claim 7, further comprising:
applying flicker filtering to the third input information before the combining.

11. The method of claim 7, further comprising:
providing the output information to a video output device.

12. The method of claim 7, wherein the second input information includes video information, and
wherein the first input information includes graphical information.

13. An apparatus comprising:
a video input port that is controllable to accept RGB input signals or non-RGB input signals;
a video output device arranged to receive video information in an RGB color space or in a non-RGB color space; and
a graphics controller between the input port and the output device to control a color space of the video input port to correspond to a color space of the video output device by receiving first input information in an RGB color space, receiving second input information in a non-RGB color space, converting the first input information to third input information in the non-RGB color space with a single color conversion, and combining the second input information and the third input information in the non-RGB color space to produce output information.

14. The apparatus of claim 13 wherein the color space of the video output device is the non-RGB color space.

15. The apparatus of claim 14 wherein the non-RGB color space is a YCbCr color space.

16. The apparatus of claim 13 including a device that selectively provides flicker filtering.

17. The apparatus of claim 13 wherein graphics controller is arranged to determine whether the video output device is a non-RGB output device.

18. The apparatus of claim 13 wherein the video output device is a digital to analog converter, an NTSC encoder, or an LCD encoder.

19. The apparatus of claim 13 wherein the graphics controller is arranged to combine non-RGB signals from the video input port with other signals in the non-RGB color space.

* * * * *